US011520541B2

(12) United States Patent
Yang

(10) Patent No.: US 11,520,541 B2
(45) Date of Patent: Dec. 6, 2022

(54) IMAGE FORMING APPARATUS, METHOD FOR SELECTING AN INDUSTRY OR PLACE ON DISPLAY AND SETTING DEFAULT OPTION BASED ON INSTALLATION ENVIRONMENT

(71) Applicant: Hewlett-Packard Development Company, L.P., Spring, TX (US)

(72) Inventor: Seung-Hae Yang, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/276,872

(22) PCT Filed: Jul. 10, 2019

(86) PCT No.: PCT/US2019/041167
§ 371 (c)(1),
(2) Date: Mar. 17, 2021

(87) PCT Pub. No.: WO2020/149878
PCT Pub. Date: Jul. 23, 2020

(65) Prior Publication Data
US 2022/0027103 A1    Jan. 27, 2022

(30) Foreign Application Priority Data
Jan. 15, 2019    (KR) .................. 10-2019-0005315

(51) Int. Cl.
*G06F 3/12*    (2006.01)
*H04N 1/00*    (2006.01)

(52) U.S. Cl.
CPC .......... *G06F 3/1231* (2013.01); *G06F 3/1203* (2013.01); *G06F 3/1224* (2013.01); *G06F 3/1253* (2013.01); *G06F 3/1285* (2013.01); *H04N 1/00503* (2013.01)

(58) Field of Classification Search
None
See application file for complete search history.

(56) References Cited

U.S. PATENT DOCUMENTS

| | | | | |
|---|---|---|---|---|
| 7,136,179 B2* | 11/2006 | Ohara | ................ | H04N 1/32529 358/1.15 |
| 2002/0054340 A1* | 5/2002 | Tokutomi | ........... | G03G 15/5079 399/24 |
| 2002/0093681 A1* | 7/2002 | Hitaka | .................. | G06F 3/1227 358/1.15 |
| 2002/0101611 A1 | 8/2002 | Shima | | |

(Continued)

FOREIGN PATENT DOCUMENTS

| | | | |
|---|---|---|---|
| JP | 2002-132476 A | 5/2002 | |
| JP | 2005-275681 A | 10/2005 | |

(Continued)

*Primary Examiner* — Haris Sabah
(74) *Attorney, Agent, or Firm* — Jefferson IP Law, LLP

(57) ABSTRACT

An example image forming includes a print engine to form an image, a display to display a user interface window for selecting at least one of an industry or a place using the image forming apparatus, and a processor to, based on at least one of the industry or the place being selected, set an option value corresponding to the at least one of the selected industry or place as a default option value for a function of the image forming apparatus.

17 Claims, 9 Drawing Sheets

(56) References Cited

U.S. PATENT DOCUMENTS

| | | | |
|---|---|---|---|
| 2003/0002078 A1 | 1/2003 | Toda et al. | |
| 2006/0077422 A1 | 4/2006 | Mathieson et al. | |
| 2007/0109584 A1 | 5/2007 | Motohashi et al. | |
| 2011/0242569 A1* | 10/2011 | Ohara | G06F 3/1228 358/1.13 |
| 2012/0243038 A1* | 9/2012 | Saeda | G06F 3/1292 358/1.15 |
| 2013/0033716 A1* | 2/2013 | Suese | G03G 15/502 358/1.13 |
| 2014/0198342 A1* | 7/2014 | Nakabayashi | H04N 1/00344 358/1.15 |
| 2014/0211253 A1* | 7/2014 | Takeuchi | G06F 3/1226 358/1.15 |
| 2017/0160997 A1 | 6/2017 | Morita et al. | |
| 2018/0302521 A1 | 10/2018 | Thamizhanandan et al. | |

FOREIGN PATENT DOCUMENTS

| | | |
|---|---|---|
| JP | 2009-54139 A | 3/2009 |
| JP | 2011-143636 A | 7/2011 |
| JP | 2013-131920 A | 7/2013 |
| JP | 2014-213536 A | 11/2014 |
| JP | 2015-166920 A | 9/2015 |

\* cited by examiner

FIG. 5

| Ex> default values | PRESENT SETTING VALUE | PREVIOUS SETTING VALUE |
|---|---|---|
| Toner alert % | 30% | 20% |
| Tray size | A3 | A4 |
| ID copy | On | Off |
| Power save time | 120 mins | 5 mins |
| Auto Tray | Off | On |
| ... | ... | ... |

IMAGE FORMING APPARATUS, METHOD FOR SELECTING AN INDUSTRY OR PLACE ON DISPLAY AND SETTING DEFAULT OPTION BASED ON INSTALLATION ENVIRONMENT

BACKGROUND

An image forming apparatus is an apparatus for printing print data generated by a terminal device such as a computer on a printing medium such as printing paper. Representative examples of an image forming apparatus include a printer, a copier, a scanner, a facsimile, and a multifunction peripheral (MFP) that integrally implements these functions.

The image forming apparatus provides various options to operate in various printing environments, and a user may use a function by selecting a corresponding option among various options.

BRIEF DESCRIPTION OF THE DRAWINGS

Various examples will be described below by referring to the following figures:

FIG. 5 is a view illustrating a setting value stored in a memory according to an example;

DETAILED DESCRIPTION

Hereinafter, various examples will be described with reference to the accompanying drawings. The examples to be described below may also be modified in various forms. In order to more clearly describe features of the examples, a detailed description of matters which are well known to those to skilled in the art to which the examples pertain may be omitted.

In the following description, a case in which any component is "connected" with another component includes a case in which the component is directly connected to the other component and a case in which the component is connected to the other component while having yet another component interposed therebetween. In addition, a case in which any component "comprises" another component means that the component may further comprise other components, and not exclude other components, unless explicitly described to the contrary.

The expression "image forming job" as used herein may refer to various jobs related with an image, such as, formation of an image or generation/storage/transmission of image files (e.g., copying, printing, scanning or faxing), and the expression "job" as used herein may refer to not only the image forming job, but also a series of processes required for performance of the image forming job.

The expression "option" as used herein may refer to options that can be selected by a user with respect to an image forming job, and if the user does not select an option while the image forming job is performed, a job may be performed with an option value set as a "default option". The "default option" is an option value that can be applied with respect to a job without changing or setting by a user.

The expression "image forming apparatus" as used herein may refer to an apparatus for printing print data generated by a terminal device such as a computer, a mobile terminal, or the like on a printing medium such as a printing paper. Representative examples of the image forming apparatus include a printer, a copier, a scanner, a facsimile, and a multifunction peripheral (MFP) that integrally implements these functions.

The expression "print data" as used herein may refer to data converted into a formant for printing. If a printer supports direct printing, a file itself could be print data.

The expression "user" as used herein may refer to a person who performs a manipulation related with an image forming job using an image forming apparatus or a device connected to the image forming apparatus in a wired or wireless manner. Further, the expression "manager" as used herein may refer to a person who has an authority to access all the functions and systems of the image forming apparatus. The "manager" and the "user" may refer to the same person.

Figure 1:
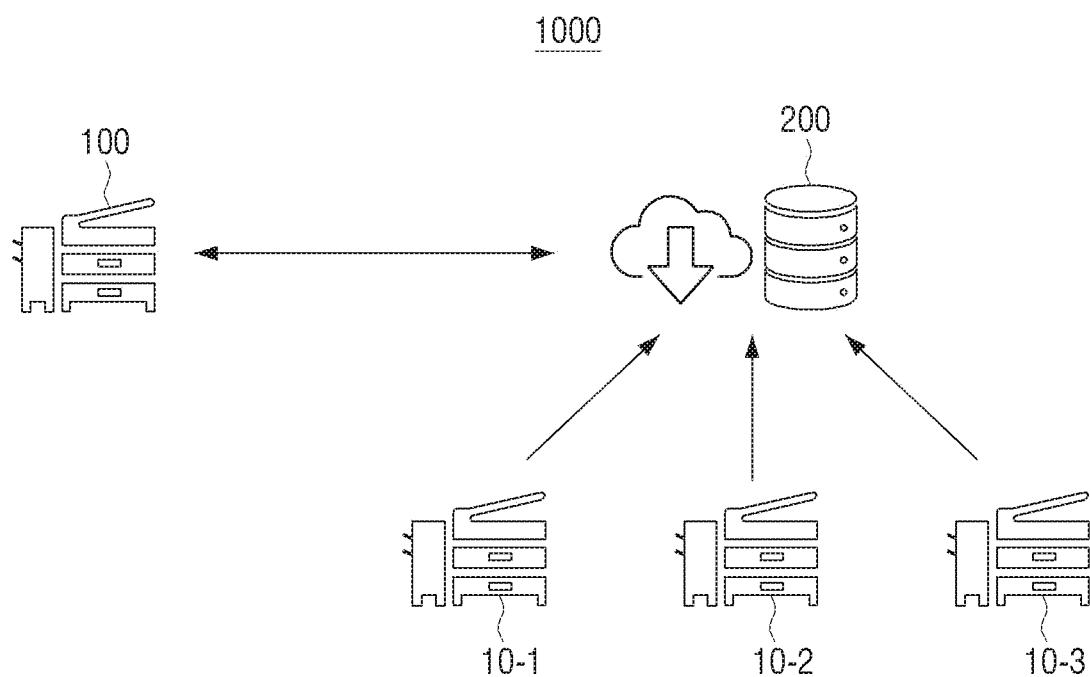
FIG. 1 is a view illustrating a configuration of an image forming system according to an example.

FIG. 1 is a view illustrating a configuration of an image forming system according to an example.

Referring to FIG. 1, an image forming system 1000 may consist of a plurality of image forming apparatuses 100, 10-1, 10-2, and 10-3 and a server device 200. For ease of explanation, an image forming apparatus newly added to the image forming system 1000 will be referred to as a new image forming apparatus 100, and image forming apparatuses already added to the image forming system 1000 will be referred to as pre-registered image forming apparatuses 10-1, 10-2, and 10-3.

Each of the pre-registered image forming apparatuses 10-1, 10-2, and 10-3 may transmit installation environment information and default option information set by each apparatus to the server device 200.

The installation environment information may include information for understanding the installation environment of the image forming apparatus such as industry information and/or place information. Such information may include a phone number, an internet protocol (IP) address, company information, department information, etc. to be used for indicating an industry or a place in which the image forming apparatus is used or located. The industry information may indicate a type of workplace (e.g., government office) using an image forming apparatus. The place information may be a location or a place in which an image forming apparatus is disposed, and in some cases, it could also mean the industry. For example, a place such as a library may indicate the industry as well.

The default option information may include an initial state that can be applied without a user's further setting among various options supported by the image forming apparatus. For example, when A4 paper is set as a default option for printing paper, it is set that a printing job is performed with A4 paper without the need for a user to change or select an option for the printing paper during a printing process.

The server device 200 may receive the installation environment information and default option information from each of the pre-registered image forming apparatuses 10-1, 10-2, and 10-3, and store the received information in a database.

The server device 200, when receiving the installation environment information for the new image forming apparatus 100, may generate a setting profile including information on an option value corresponding to the installation environment information, and transmit the generated setting profile to the new image forming apparatus 100. An example configuration and operation of the server device 200 will be described with reference to FIG. 4.

The new image forming apparatus 100 may receive its own installation environment information, and provide the received installation environment information to the server device 200. As an example, the new image forming apparatus 100 may receive information on an industry or a place from a user through a user interface window, and provide the received installation environment information on the industry or the place to the server device 200.

The new image forming apparatus 100, if receiving a setting profile corresponding to the provided installation environment information, may set at least one printing option included in the received setting profile as a default operation value. An example configuration and operation of an image forming apparatus will be described with reference to FIG. 2 and FIG. 3.

As described above, the image forming system 1000 according to an example may collectively change option settings based on the installation environment of the image forming apparatus 100, and thus a user may easily set an initial option.

In the description of FIG. 1, it is described that the installation environment information is provided to the server device 200, and an option value or a setting profile is provided from the server device 200. However, in implementation, the image forming apparatus 100 may set a default option by selecting a pre-stored look-up table as an option value corresponding to an installation environment when a product is released.

Figure 2:
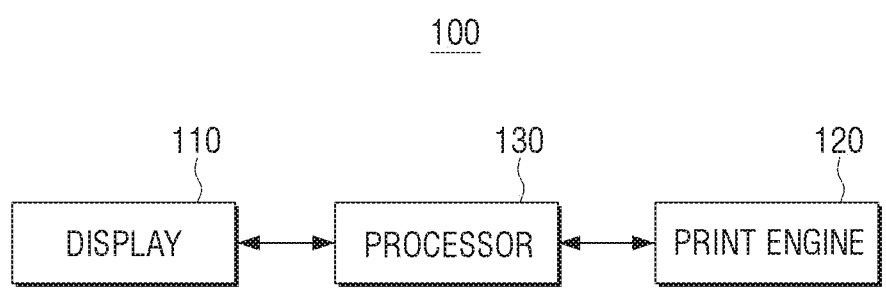
FIG. 2 is a block diagram illustrating a configuration of an image forming apparatus according to an example.

FIG. 2 is a block diagram illustrating a configuration of an image forming apparatus according to an example.

Referring to FIG. 2, an image forming apparatus 100 may include a display 110, a print engine 120, and a processor 130.

The display 110 may display a user interface window for selecting various functions supported by the image forming apparatus 100. The display 110 may be a monitor using elements such as a liquid crystal display (LCD), a cathode ray tube (CRT), a light emitting diode (LED), an organic LED (OLED), etc., and may be embodied as a touch screen which can perform the function of an operation input device as well.

The display 110 may display a user interface window for selecting an installation environment in which the image forming apparatus 100 is used. Such a user interface window may be displayed during an initial setup process of the image forming apparatus. The installation environment information may include the industry and/or place of the image forming apparatus 100 such as a pharmacy, a hospital, a library, etc., or information that can help determine the industry or place indirectly, for example, a company name, a department, a phone number, a fax number, an IP address, a main task, etc.

The display 110 may display a message for confirming the purpose of use of an image forming apparatus or interaction information provided from the server device 200. Various examples of user interface windows that may be displayed on the display 110 will be described with reference to FIG. 6 and FIG. 8.

The print engine 120 may form an image. The print engine 120 may print a print image generated by the processor 130 on a printing medium such as printing paper. The print engine 120 may perform printing using an electrophotography method, an inkjet method, or the like. The print engine 120 may be a mono-print engine which can perform printing with a single color, or a print engine that can perform multi-color printing.

The processor 130 may control the image forming apparatus 100. As an example, the processor 130 may confirm whether the image forming apparatus 100 performs initial booting, and if the image forming apparatus 100 performs initial booting, may perform a series of operations for performing an initial setting of options of the image forming apparatus 100. The series of operations may be performed not only at initial booting, but also upon a request from a user.

When it is confirmed that the option setting is necessary, the processor 130 may control the display 110 to display a user interface window for selecting the installation environment of the image forming apparatus 100.

When receiving the installation environment from the user, the processor 130 may determine an option value corresponding to the selected installation environment. The determining of the option value may use information stored in a memory, or information stored in a server device (e.g., the server device 200 of FIG. 1). Example operations will be described with reference to FIG. 3.

The processor 130 may set the determined option value as a default option value. For example, when a user sets an installation place as a library, and the option values corresponding to the library are 2-up and A4 printing paper, the processor 130 may set 2-up as a default option with respect to the option for n-up, and A4 printing paper as a default option with respect to the option for printing paper.

As described above, the processor 130 may set a determined option value as a default option value through an option setting process method, and may not go through a firmware update process. Therefore, although the above-described setting process is performed, an additional rebooting operation may be unnecessary.

An example configuration of an image forming apparatus has been described and explained. However, in other examples, various constituent elements may be added. An example of an image forming apparatus including other constituent elements will be described below with reference to FIG. 3.

Figure 3:
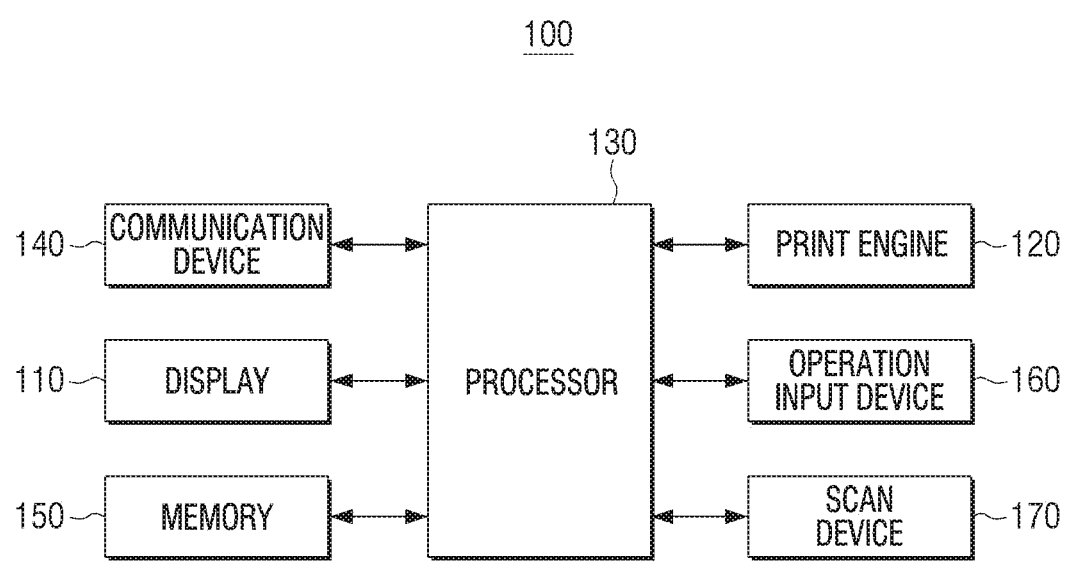
FIG. 3 is a block diagram illustrating a configuration of an image forming apparatus according to an example.

FIG. 3 is a block diagram illustrating a configuration of an image forming apparatus according to an example.

Referring to FIG. 3, an image forming apparatus 100 may include a display 110, a print engine 120, a processor 130, a communication device 140, a memory 150, an operation input device 160, and a scan device 170.

The display 110 and the print engine 120 have been described with reference to FIG. 2, and thus a repeated description will be omitted. In addition, the processor 130 also has been described with reference to FIG. 2. Therefore, a redundant description of FIG. 2 will be omitted, but the configurations added to FIG. 3 will be described below.

The communication device 140 may be configured to connect to an external device (not shown). The communication device 140 may be embodied to connect to the external device through a Local Area Network (LAN), an Internet network, or the like, but may also be embodied to connect to the external device through a Universal Serial Bus (USB) port, a wireless communication (e.g., WiFi 802.11a/b/g/n, near field communication (NFC), Bluetooth, etc.) port, or the like. The communication device 140 may be referred to as a transceiver.

The communication device 140 may transmit installation environment information of an industry and/or a place selected by a user to the server device 200. The communication device 140 may receive a setting profile (e.g., a print option value, etc.) corresponding to the transmission of the installation environment information from the server device 200. The setting profile may be information on an option value for each of a plurality of options among options that can be set by the image forming apparatus.

The communication device 140 may receive interaction information from the server device 200 and may transmit response information corresponding to the interaction information to the server device 200. The response information may be received from the user or may be default information stored in the image forming apparatus 100.

The communication device 140 may transmit the installation environment information and information on a default option value set by the image forming apparatus 100 to the server device 200. Such transmission may be performed periodically, may be performed upon the request of the server device 200, or may be performed upon an input of a user of the image forming apparatus 100.

The memory 150 may store a program for driving the image forming apparatus 100. The memory 150 may store print data received from a printing control terminal device (not shown).

The memory 150 may store information on a default option set by the image forming apparatus 100. The default option may be set to a specific value when the image forming apparatus 100 is released at an earlier stage, such as by a manufacturer. Also, specific options could be updated according to setting information received at a later time.

The memory 150 may store a look-up table containing various installation environment-specific option values. An example look-up table may include information on a plurality of installation environments and at least one option value for each of the plurality of installation environments. For example, the look-up table may store a plurality of industry-specific option values, a plurality of place-specific option values, a plurality of industry/place-specific option values, or the like. Such a look-up table may be stored when a product is released by a manufacturer, updated through a firmware update, etc.

The memory 150 may be embodied as an internal storage medium in the image forming apparatus 100 or an external storage medium, for example, a removable disk such as a USB memory, a web server through a network, etc.

The operation input device 160 may receive a user selection such as a function selection, a control command for the function, or the like. Examples of a function selection may include printing, copying, scanning, fax transmission, etc. Such function control command may be received through a control menu displayed on the display 110.

A user or manager may input (or select) the installation environment through the operation input device 160. The operation input device 160 may receive response information corresponding to interaction information from the user or manager in an interactive setting process.

The scan device 170 may receive documents and generate scan images. The scan images generated by the scan device 170 may be stored in the memory 150. An option regarding a scan job as well as an option regarding the printing job may be initially set up when the image forming apparatus 100 is provided with the scan device 170.

For example, when a user sets place information as "library," and an option value regarding scanning corresponding to a library is 300×300 dpi scan (or a low-resolution scan), the processor 130 may set 300×300 dpi scan (or a low resolution scan) as a default option with respect to the option regarding the scan resolution.

The processor 130 may confirm whether the image forming apparatus 100 is able to perform communication with the server device 200. If communication with the server device 200 is not possible, the processor 130 may control the display 110 to display a user interface window for selecting the installation environment recorded in a look-up table stored in the memory 150. When receiving the installation environment from the user, the processor 130 may determine at least one option value corresponding to the selected installation environment by using the look-up table stored in the memory 150, and set the determined option value as a default value.

In an example, the processor 130 may control the communication device 140 to request information related to the user interface to the server device 200, and when the information on the user interface window is received, control the display 110 to display a user interface window.

The user may input installation environment information, for example, industry or place information, or receive an IP address, a phone number, company information, department information, etc. that corresponds to the installation environment, through a user interface. When the installation environment information is input, the processor 130 may provide the input installation environment information to the server device 200.

To the extent necessary, the processor 130 may control the communication device 140 to request interaction information for confirming the purpose of use. Upon the request, if interaction information is received through the communication device 140, the processor 130 may control the display 110 to display a user interface window including the received interaction information. When response information corresponding to the interaction information is input through the user interface window, the processor 130 may control the communication device 140 to transmit the response information. In an example, the interaction information may be received and the response information may be transmitted repeatedly.

When receiving at least one option value or a setting profile from the server device 200, the processor 130 may set a default option value based on the received at least one option value or the setting profile.

After the default option is set, the processor 130 may perform a printing job using a predetermined default option value when receiving the printing job. When receiving a scanning job, the processor 130 may use a default option value with respect to a predetermined scanning function to perform the scanning job.

When a predetermined event occurs, the processor 130 may control the communication device 140 to transmit the installation environment information and the information on the set default option value to the server device 200. The predetermined event may occur at a predetermined period. When information on a default option value is received from the server device 200, the default option value set by the image forming apparatus 100 may be changed.

According to an example, the option settings of the image forming apparatus 100 could collectively reflect options generally applied to other image forming apparatuses that operate in an environment similar to the installation environment of the image forming apparatus 100.

Figure 4:
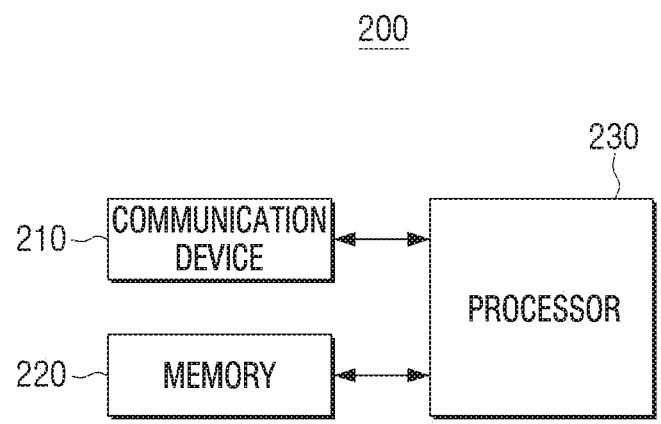
FIG. 4 is a block diagram illustrating a configuration of a server device according to an example.

FIG. 4 is a block diagram illustrating a configuration of a server device according to an example.

Referring to FIG. 4, a server device 200 may consist of a communication device 210, a memory 220, and a processor 230.

The communication device 210 may be configured to connect the server device 200 to an external device. The communication device 210 may be embodied to connect the server device 200 through a LAN, an Internet network, or the like, but may also be embodied to connect the server device 200 via a USB port, a wireless communication (e.g., WiFi 802.11a/b/g/n, NFC, Bluetooth, etc.) port, or the like. The communication device 210 may also be referred to as a transceiver.

The communication device 210 may receive installation environment information from an image forming apparatus 100. The communication device 210 may also receive information on a predetermined default option from the image forming apparatus 100 in which a default option is set.

The communication device 210 may transmit an option value or a setting profile corresponding to the installation environment information to the image forming apparatus 100.

In setting an interaction type for confirming a user type, the communication device 210 may transmit interaction information to the image forming apparatus 100, and receive response information corresponding to the interaction information.

The memory 220 may store programs for driving the server device 200. For example, the memory 220 may store received log information. In more detail, the memory 220 may store an option value for each of a plurality of image forming apparatuses classified by installation environment. For example, the memory 220 may store a plurality of industry-specific option values, a plurality of place-specific option values, a plurality of industry/place-specific option values, or the like.

The memory 220 may store interaction information for interaction type setting. The memory 220 may be embodied as an internal storage medium in the server device 200 or an external storage medium, for example, a removable disk such as a USB memory, a web server through a network, etc.

The processor 230 may control the server device 200. The processor 230, when receiving installation environment information or information on a default option value from each of the image forming apparatuses 10-1, 10-2, 10-3, and 100 may create a database of the received information and store the information in the memory 220.

The server device 200 may store option value information set for each of image forming apparatuses classified by installation environment. For example, the server device 200, with respect to an n-up printing option, may store information indicating that among the image forming apparatuses classified as library, 250 image forming apparatuses set 1-up, 111 image forming apparatuses set 2-up, and 78 image forming apparatuses set 4-up.

If not receiving industry or place information that is directly identifiable, an installation environment of an image forming apparatus may be predicted by using an additionally input IP address, phone number, company address, department information, etc. For example, when receiving a fax number of the image forming apparatus, a phone number of the image forming apparatus, a company name of the image forming apparatus, or the like, the processor 230 may transmit the fax number, the phone number, the company name, or the like to a server, such as a phone number server (not shown), and obtain industry information and/or place information.

When receiving installation environment information (i.e., industry and/or place information) with respect to the image forming apparatus 100, the processor 230 may generate a setting profile including information on an option value corresponding to the installation environment information. For example, when receiving installation environment information indicating library, the processor 230 may identify an option value (e.g., 1-up, A4, etc.) most used in the library, and generate a setting profile containing the identified option value.

The processor 230 may generate a setting profile based on a function supported by the image forming apparatus 100. For example, when option information with reference to a scanning function corresponding to the library location is in the database, if the image forming apparatus 100 does not support a scanning function, option information related to the scanning function may be unnecessary. In this regard, the processor 230 may generate a setting profile having most-preferred options of the industry among functions supported by the image forming apparatus 100.

The processor 230 may control the communication device 210 to transmit the generated setting profile to the image forming apparatus 100.

The server device 200, according to an example, may store option values appropriate for the installation environment in a database, and provide an option value appropriate for an installation environment of the image forming apparatus 100 based on the stored information.

FIG. 5 is a view illustrating a setting value stored in a memory according to an example.

Referring to FIG. 5, a memory may store default option values with respect to a plurality of options (e.g., toner alert %, tray size, ID copy, power save time, auto tray, etc.). The illustrated "previous setting value" may be a default option value set when a product is released, and the illustrated "present setting value" may be a default option value when an initial option is set according to an example.

In the above-described options, toner alert % may be an option for selecting when an alert will be provided regarding an amount of remaining toner. Initially, an alert may be shown when remaining toner is equal to or less than 20%. However, after the initial setting, the default option may be modified to an option value in which an alert is shown when the remaining toner is equal to or less than 30%.

The tray size may be an option indicating the paper size to be used in a printing job. The ID copy may be an option indicating whether or not the copy operation should be performed based on confirmation of a user ID. The power save time may be an option used to select an amount of idle time before the image forming apparatus performs a power saving operation, and auto tray may be an option that indicates whether to automatically change the tray (e.g., select a different tray if a default tray is empty).

The above-described options are merely example options that can be set to the image forming apparatus 100, and in an actual implementation, options could vary rather than the above-described options.

In an example, when an image forming apparatus is installed, a user may set a large number of options corresponding to the applied workplace. However, a conventional image forming apparatus has a basic value for each country, or changes several option values through a firmware update, etc. but has difficulty in initial setting appropriate for an actual industry or environment. For example, when several option settings are changed using a firmware update or a special function enable (SFE) function, an image forming apparatus should be booted again.

According to an example, by confirming information of the environment in which the image forming apparatus 100 is installed, and setting an option value used by many users with respect to the installed environment as a default value at the earlier stage, a time for installing settings may be reduced.

Figure 6:
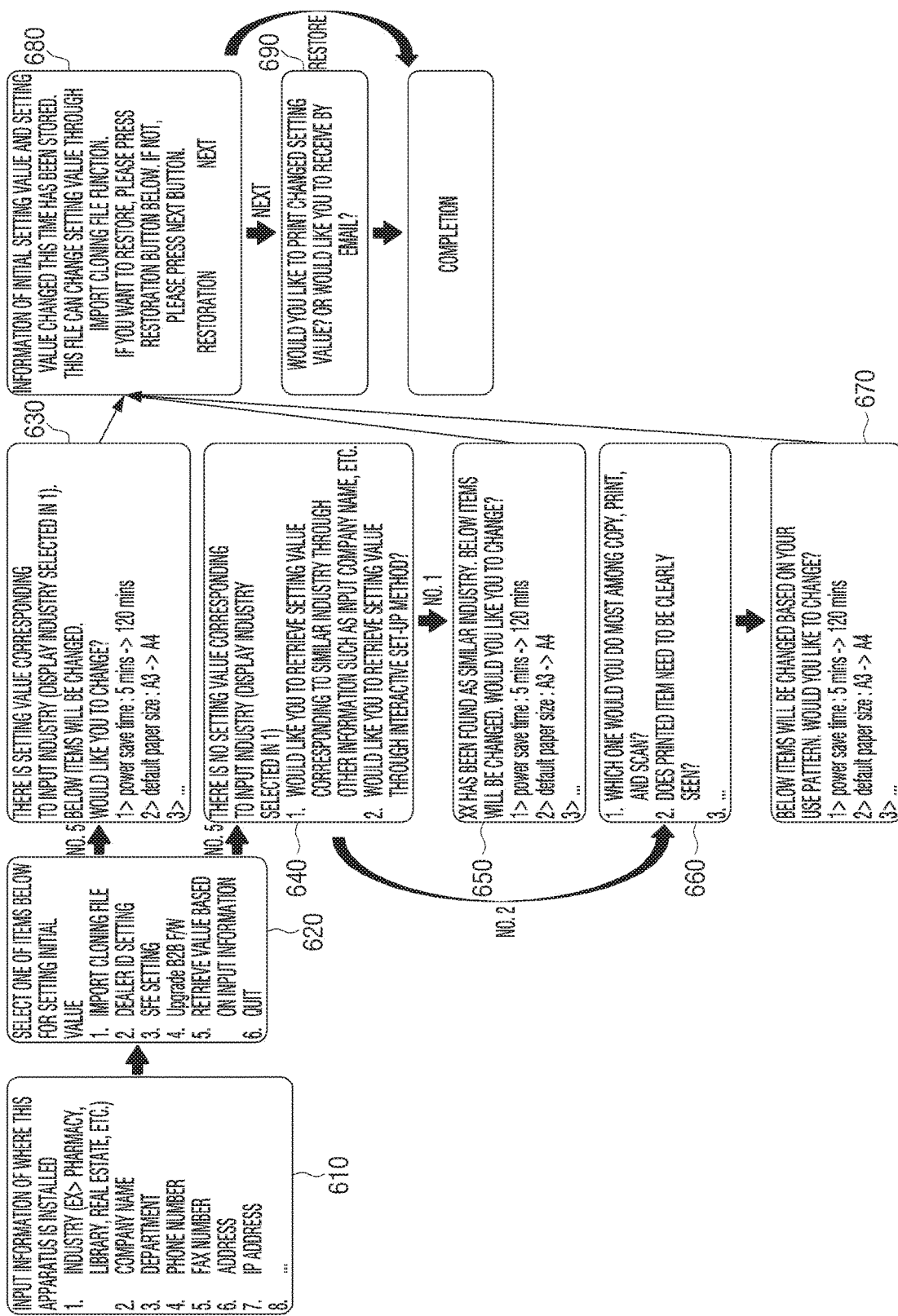
FIG. 6 is a view illustrating various interface windows displayable on a display according to an example.

FIG. 6 is a view illustrating various interface windows displayable on a display according to an example.

Referring to FIG. 6, a first user interface window 610 may include a plurality of areas for receiving installation environment information. For example, the first user interface window 610 may include an area for receiving an industry, a company name, a department, a phone number, a fax number, an IP address, etc. The user may input installation environment information by using the displayed area.

For example, when library is input as the industry, a printing option value may be set so that the amount of toner consumption may be reduced. As another example, when insurance company is input as the industry, clearly printed documents may be important to ensure legibility of printed terms, conditions, etc. Therefore, a setting may be performed to display a toner change alert regarding resolution. As another example, when pharmacy is set as the industry, a paper size corresponding to a pill bag or the like may be set.

The second user interface window 620 may receive an initial setting method. As an example, through the second user interface window 620, it may be selected whether an initial setting proceeds with a conventional method (e.g., Import Cloning file, Dealer ID setting, SFE setting, Upgrade B2B F/W, etc.), or with information input through the first user interface window 610.

The Import Cloning File may be a method of copying and using default option values of another image forming apparatus. The SFE setting may have various setting values for each SFE value, and when the specific SFE value is turned on, the option corresponding to the corresponding SFE value may be set. For example, if SFE001 among the SFE values sets the power save time to 120 minutes, the power save time in the image forming apparatus may be set to 120 minutes if SFE001 is turned on.

The Dealer ID may be a function to turn on/off the above-described SFE values at a time, and the Upgrade B2B F/W may be a method of downloading the F/W having a special setting value or function from the server device to proceed with setting.

When the user selects the option to proceed with the initial setting based on the information input through the first user interface window 610, a third user interface window 630 or a fourth user interface window 640 may be displayed.

When there exists at least one option value corresponding to the input information, the third user interface window 630 may include an area confirming whether to change a default option to the option value. For example, when there exists information on the industry input through the first user interface window 610, entire setting value information corresponding to the industry may be obtained from the server device 200 or the memory 150. As an example, if it is impossible to use a network, a value stored in a look-up table pre-stored in the image forming apparatus 100 may be obtained, and if a network can be used, an industry preference setting value may be obtained from the server device 200.

The fourth user interface window 640, when there is no option value corresponding to the input information, may include an area for confirming whether to proceed with a different method. For example, when there is no value corresponding to the industry input through the first user interface window 610, it is possible to search for a setting value corresponding to a similar industry by using different information input to the first user interface window 610, or select an interactive set-up method through the fourth user interface window 640.

The fifth user interface window 650 may be an interface window to be displayed when selecting to retrieve a setting value corresponding to the similar industry from the fourth user interface window 640. For example, information on an installed web site may be identified through the information additionally input through the first user interface window 610, that is, a company name, a department, an IP address, a phone number, etc., and a setting preferred by the similar site may be displayed as a search result.

The sixth and seventh user interface windows 660 and 670 may each be a user interface window that can be displayed when an interactive setting method is selected in the fourth user interface window 640. Examples of operations of the interactive set-up method and user interface windows that can be displayed will be described with reference to FIG. 7 and FIG. 8.

The eighth user interface window 680 may include an area for confirming to set a value selected by a user as a default option. When the user selects confirmation through the area, option values selected in the previous process may be set as default option values.

The image forming apparatus 100 may store each of an initial setting value and a setting value determined by a user's selection in a previous process as a cloning file. To this end, a default option value may be changed through an import cloning file function according to a user's selection. In addition, when a user wishes to restore a setting value, the setting value may be restored in this step.

The ninth user interface window 690 may include an area for selecting a notification method of the selected option value. For example, a user may receive the information on the option value set in the above-described process by email, print, text, etc.

Figure 7:
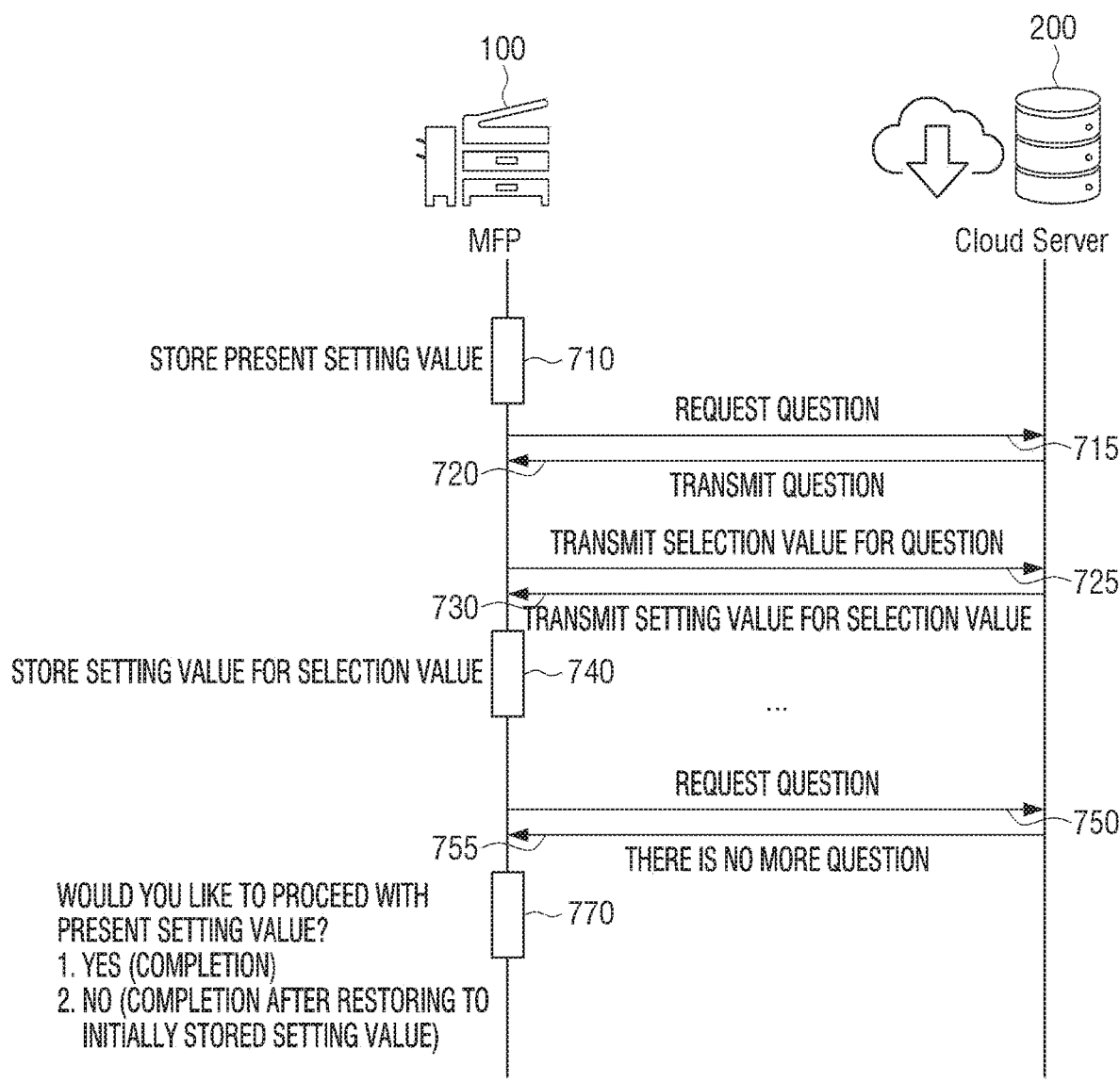
FIG. 7 is a sequence view of an interactive set-up method according to an example.

FIG. 7 is a sequence view of an interactive set-up method according to an example.

Referring to FIG. 7, an image forming apparatus 100 may store a present setting value at operation 710, and request a server device 200 for an interactive setting at operation 715.

The server device 200 that receives the request may transmit an inquiry to the image forming apparatus at operation 720. As an example, the server device 200 may transmit an inquiry considering information on the received industry and/or place.

The image forming apparatus 100 may display the inquiry received from the server device 200 and receive a response corresponding to the inquiry from a user. The image forming apparatus 100 may transmit the received user response to the server device 200 at operation 725.

The server device 200 that receives the response may transmit a selection value corresponding to the response at operation 730 and the image forming apparatus 100 may store the received selection value in operation 740. In an example, the server device 200 and the image forming apparatus 100 may exchange an additional inquiry and response when the additional inquiry is necessary for option setting at steps 750 and 755.

When an option value is received, the image forming apparatus 100 may temporarily store the received option value. The previously received option values may be collectively set to a default option according to the final user decision at operation 770.

Figure 8:
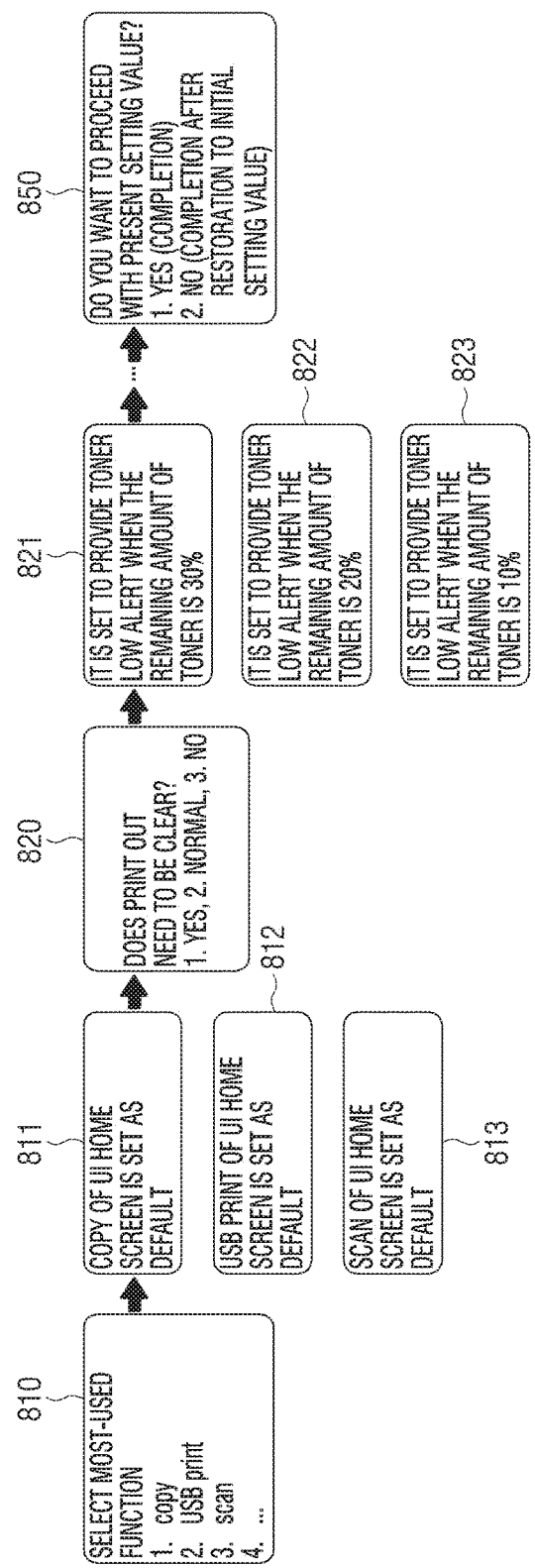
FIG. 8 is a view illustrating user interface windows displayable in an interactive set-up process according to an example.

FIG. 8 is a view illustrating user interface windows displayable in an interactive set-up process according to an example.

Referring to FIG. 8, a first user interface window 810 may provide for selection of a preferred job of a user. The displayed item may be limited to the function supported by the image forming apparatus 100.

The second to fourth user interface windows 811, 812 and 813 may each be an area to display a result of the user selection in the first user interface window 810. For example, a UI home screen may be set to correspond to the job preferred by the user, and the result thereof will be guided to the user.

Through the fifth user interface window 820, the preference of a printing function may be selected. The sixth to eighth user interface windows 821, 822 and 823 may be areas to display results according to the preference selected in the fifth user interface window 820. For example, an alarm for indicating an amount of remaining of toner may be differently set by a user's preference, and the result may be guided to the user.

By performing the above described process repeatedly, a user's preference may be confirmed, and an option value corresponding thereto may be determined.

The ninth user interface window 850 may include an area for confirming whether to set the values selected.

In the implementation, the server device 200 may store the above-described inquiry and response result in a database for use.

Figure 9:
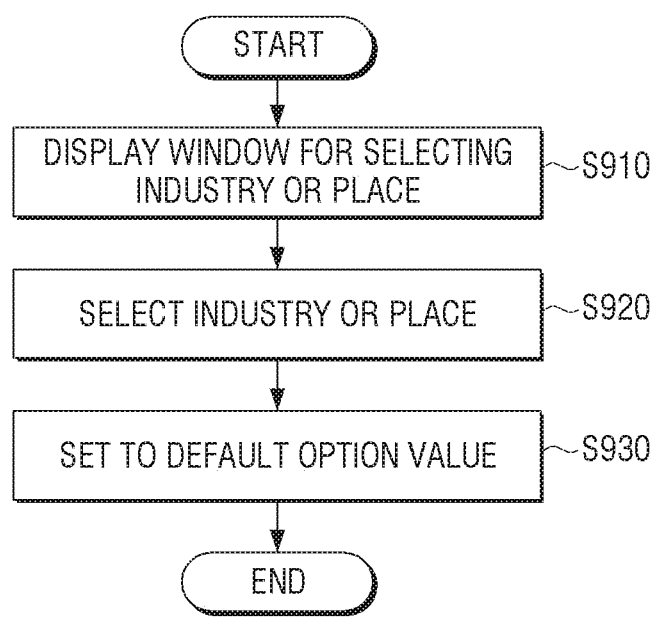
FIG. 9 is a flowchart of an option setting method according to an example.

FIG. 9 is a flowchart of an option setting method according to an example.

Referring to FIG. 9, a user interface window for selecting at least one of an industry or a place in which an image forming apparatus is used may be displayed at operation S910. The user interface window may include an area for receiving at least one of an IP address, a phone number, company information, department information, etc. of the image forming apparatus, and may display interaction information for confirming how to use the image forming apparatus.

At least one of an industry or a place may be selected at operation S920. Not only an industry or a place for indicating the installation environment, but also an IP address, a phone number, company information, department information, and the like may be input.

An option value corresponding to at least one of the selected industry or place may be set to a default option value with respect to the function of the image forming apparatus at operation S930. As an example, by using a pre-stored look-up table including a plurality of industries and places, and at least one option value with respect to each of the plurality of industries and places, an option value corresponding to at least one of the selected industry or place may be selected, and the selected option value may be set to a default option value.

Information on at least one of the selected industry or place may be transmitted to the server device, a setting profile corresponding to information transmitted from the server device may be received, and an option value included in the received setting profile may be set to a default option value.

When initial setting is completed, an image forming apparatus may periodically transmit information on the selected industry or place and information on the default option value set by the image forming apparatus to the server device.

An option setting method according to an example may comprise collectively reflecting options generally applied to other image forming apparatuses that operate in the similar environment to the installation environment, and thus a user may more easily proceed with an initial setting.

The above-described examples of option setting methods may be embodied as programs to be provided to an image forming apparatus. The programs may be stored in a non-transitory computer readable medium to be provided.

The non-transitory computer readable medium refers to a medium that stores data semi-permanently rather than storing data for a very short time, such as a register, a cache, and a memory, and is readable by an apparatus. As an example, the above-described various applications or programs may be stored in a non-transitory computer readable medium such as a compact disc (CD), a digital versatile disk (DVD), a hard disk, a solid-state disk (SSD), a Blu-ray disk, a universal serial bus (USB) memory stick, a memory card, and a read only memory (ROM), and may be provided.

Although examples have been shown and described, it will be appreciated by those skilled in the art that changes may be made to these examples without departing from the principles and spirit of the disclosure. Accordingly, the scope of the disclosure is not construed as being limited to the described examples, but is defined by the appended claims as well as equivalents thereto.

What is claimed is:

1. An image forming apparatus, comprising:
a print engine to form an image;
a display to display a user interface window for selecting at least one of an industry or a place using the image forming apparatus;
a communication device to, based on at least one of the industry or the place being selected, transmit information on the at least one of the selected industry or place to a server device and receive a setting profile corresponding to the transmitted information from the server device; and
a processor to set an option value corresponding to the at least one of the selected industry or place included in the received setting profile as a default option value for a function of the image forming apparatus.

2. The image forming apparatus as claimed in claim 1, further comprising:
a memory to store a look-up table including information on a plurality of industries or places and at least one option value with respect to each of the plurality of industries or places,
wherein the processor selects an option value corresponding to the at least one of the selected industry or place using the look-up table.

3. The image forming apparatus as claimed in claim 1, wherein the processor controls the communication device to periodically transmit information on the selected industry or place and information on the default option value set for the image forming apparatus to the server device.

4. The image forming apparatus as claimed in claim 1, wherein the processor, based on receiving interaction information for confirming a use method of the image forming apparatus from the server device, controls the display to display the received interaction information on the user interface window, and controls the communication device to transmit response information corresponding to the displayed interaction information to the server device.

5. The image forming apparatus as claimed in claim 1, wherein the user interface window receives at least one of an internet protocol (IP) address of the image forming apparatus, a phone number, company information, or department information as additional information, and
wherein the processor controls the communication device to transmit the additional information input through the user interface window to the server device.

6. The image forming apparatus as claimed in claim 1, wherein the user interface window for selecting the at least one of the industry or the place using the image forming apparatus is displayed during at least one of an initial setup process of the image forming apparatus or based on a received user request.

7. The image forming apparatus as claimed in claim 1, wherein the display is to display a message for confirming a purpose of use of the image forming apparatus or interaction information provided from the server device.

8. A server device, comprising:
a memory to store an option value for each of a plurality of image forming apparatuses classified by an industry or a place;
a communication device to communicate with an image forming apparatus; and
a processor to, based on receiving information on at least one of the industry or the place from the image forming apparatus, generate a setting profile including information on an option value to be applied to the image forming apparatus based on the received information on the at least one of the industry or the place and the stored option value, and control the communication device to transmit the generated setting profile to the image forming apparatus.

9. The server device as claimed in claim 8, wherein the processor confirms an available function of the image forming apparatus, and generates the setting profile including the information on the option value applied to the image forming apparatus further considering the available function of the image forming apparatus.

10. The server device as claimed in claim 8,
wherein the communication device receives information on the at least one of the industry or the place for the image forming apparatus and information on a default option value applied to the image forming apparatus, and
wherein the processor updates information stored in the memory based on the received information on the at least one of the industry or the place and the information on the default option value.

11. A non-transitory machine-readable storage medium encoded with instructions executable by a processor, the machine-readable storage medium comprising:
instructions to display a user interface window for selecting at least one of an industry or a place using an image forming apparatus;
instructions to, based on at least one of the industry or the place being selected, transmit information on the at least one of the selected industry or place to a server device and receive a setting profile corresponding to the transmitted information from the server device; and
instructions to set an option value corresponding to the at least one of the selected industry or place included in the received setting profile as a default option value for a function of the image forming apparatus.

12. The non-transitory machine-readable storage medium as claimed in claim 11, further comprising: instructions to store a look-up table including information on a plurality of industries or places and at least one option value with respect to each of the plurality of industries or places; and instructions to select an option value corresponding to the at least one of the selected industry or place using the look-up table.

13. The non-transitory machine-readable storage medium as claimed in claim 11, further comprising instructions to periodically transmit information on the selected industry or place and information on the default option value set for the image forming apparatus to the server device.

14. The non-transitory machine-readable storage medium as claimed in claim 11, further comprising instructions to, based on receiving interaction information for confirming a use method of the image forming apparatus from the server device, display the received interaction information on the user interface window, and transmit response information corresponding to the displayed interaction information to the server device.

15. The non-transitory machine-readable storage medium as claimed in claim 11, further comprising: instructions to receive at least one of an internet protocol (IP) address of the image forming apparatus, a phone number, company information, or department information as additional information; and instructions to transmit the additional information input through the user interface window to the server device.

16. The non-transitory machine-readable storage medium as claimed in claim 11, further comprising instructions to display the user interface window for selecting the at least one of the industry or the place using the image forming apparatus during at least one of an initial setup process of the image forming apparatus or based on a received user request.

17. The non-transitory machine-readable storage medium as claimed in claim 11, further comprising instructions to display a message for confirming a purpose of use of the image forming apparatus or interaction information provided from the server device.

* * * * *